United States Patent [19]
Ellsworth et al.

[11] Patent Number: 5,944,439
[45] Date of Patent: *Aug. 31, 1999

[54] METAL SHELVING CONNECTOR AND KIT

[75] Inventors: Thomas L. Ellsworth, Shorewood; Stanley R. Thorud, New Hope, both of Minn.

[73] Assignee: Safco Products Co., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/593,661

[22] Filed: Jan. 29, 1996

[51] Int. Cl.$^6$ ........................................... B25G 3/00
[52] U.S. Cl. .......................... 403/231; 403/247; 403/256; 403/403; 52/282.3; 312/111; 211/90.01
[58] Field of Search ..................... 403/231, 256, 403/260, 247, 403; 312/111, 140, 265.1, 265.2, 265.3, 265.4; 52/272, 282.1, 282.3, 284; 211/90, 182, 186, 188, 153, 189, 206

[56] References Cited

U.S. PATENT DOCUMENTS

| | | | |
|---|---|---|---|
| 3,255,721 | 6/1966 | Peterschmidt | 211/182 X |
| 4,099,815 | 7/1978 | Cox et al. | 312/140 X |
| 4,105,348 | 8/1978 | Anderson et al. | 312/140 X |
| 4,108,520 | 8/1978 | Litchfield | 312/140 X |
| 4,273,462 | 6/1981 | Fukuchi | 403/231 X |
| 4,303,289 | 12/1981 | Hardy | 403/231 X |
| 4,702,638 | 10/1987 | Zalesak | 403/231 X |
| 4,781,644 | 11/1988 | Yoshida | 211/182 X |
| 5,345,737 | 9/1994 | Latchinian | 403/231 X |
| 5,470,139 | 11/1995 | Hsiao | 312/111 X |
| 5,516,225 | 5/1996 | Kvols | 312/265.1 X |

OTHER PUBLICATIONS

Fellowes brochure for "Liberty/Sorter with horizontal partitions—#1512, #1514".

*Primary Examiner*—Daniel P. Stodola
*Assistant Examiner*—Bruce A. Lev
*Attorney, Agent, or Firm*—Patterson & Keough, P.A.

[57] ABSTRACT

A shelving connector has symmetrical arms for locking insertion into metal shelving. The shelving and the connector preferably include radiused surfaces for safety and attractive appearance. The radiused edges of the metal shelving serve a dual function of stiffening the shelving and providing a receiver for arms projecting from the connector. The connector preferably has resilient tabs which are captured in apertures in the receivers. The connector can be advantageously formed from injection molded ABS plastic.

7 Claims, 5 Drawing Sheets

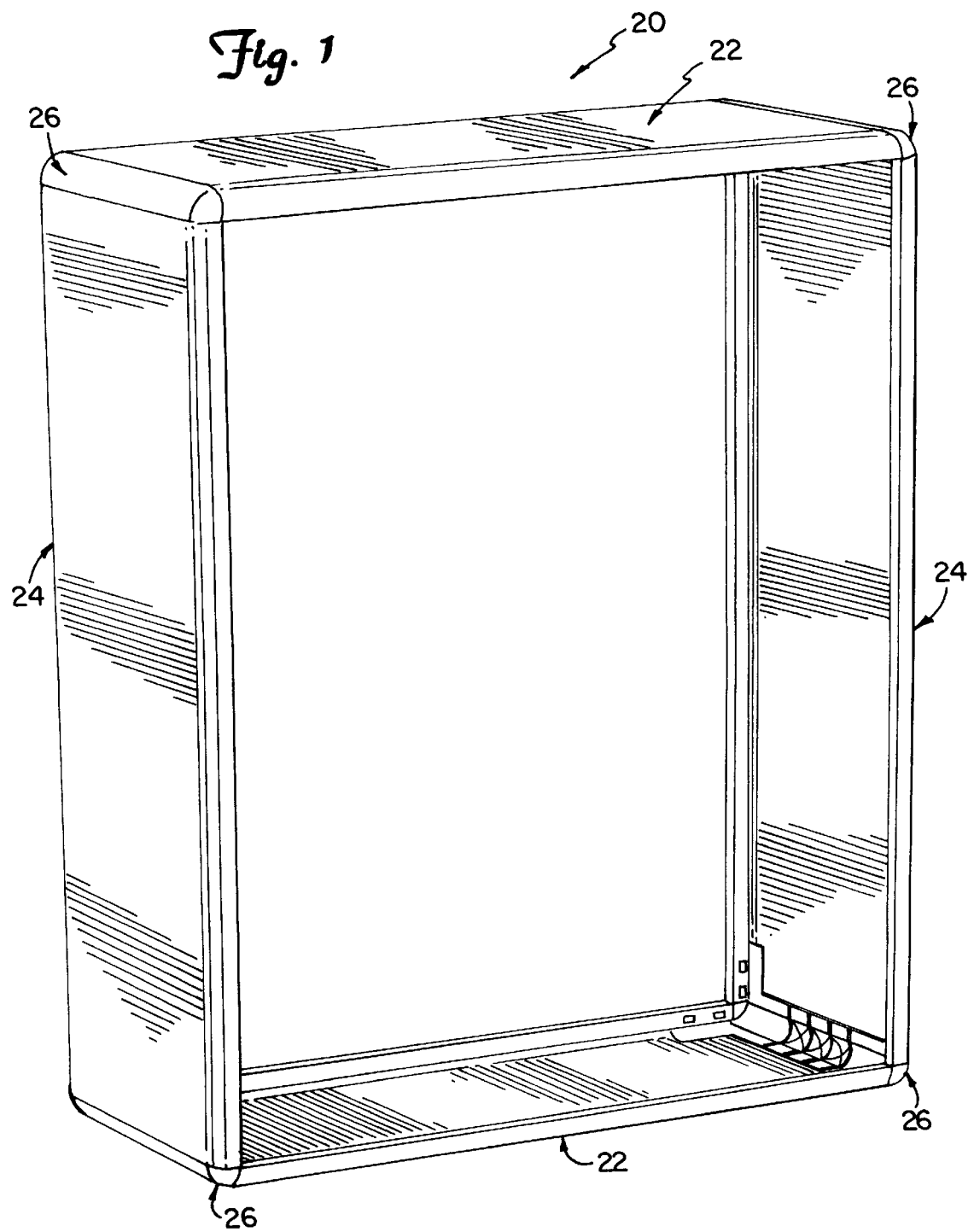

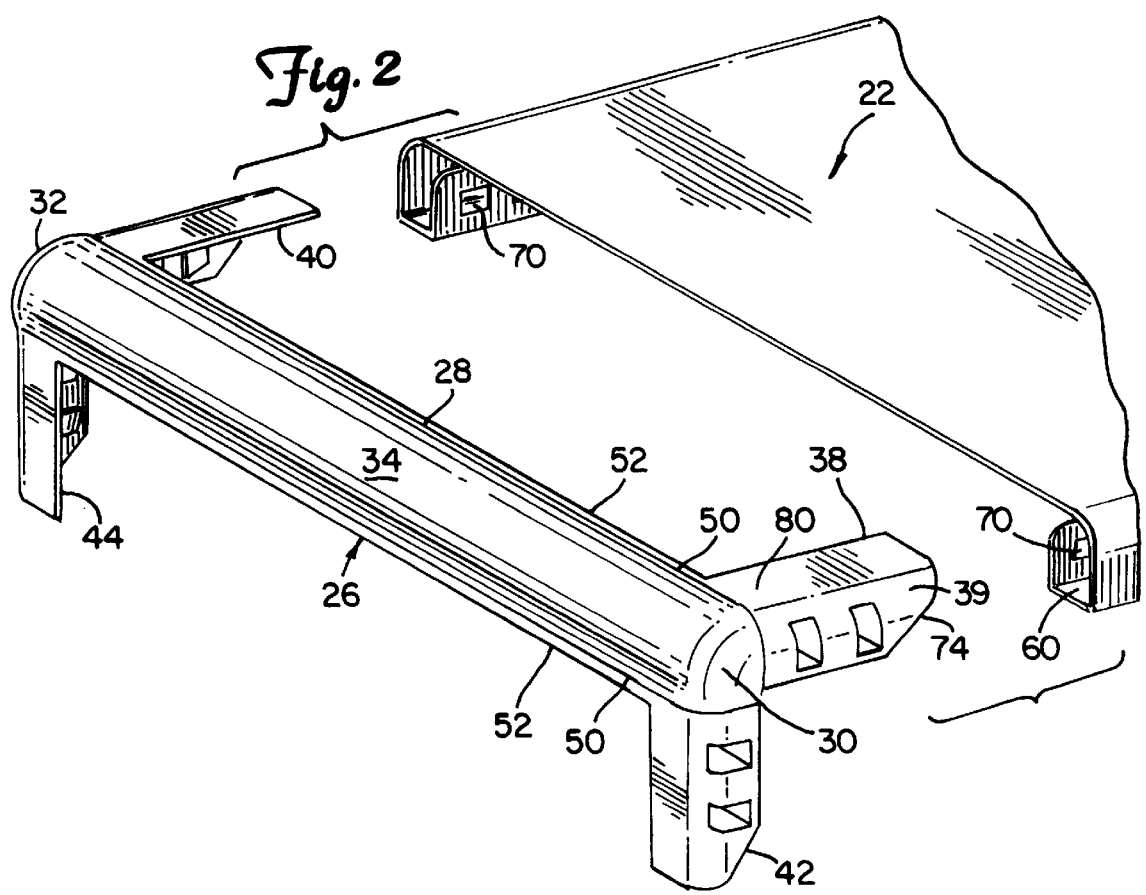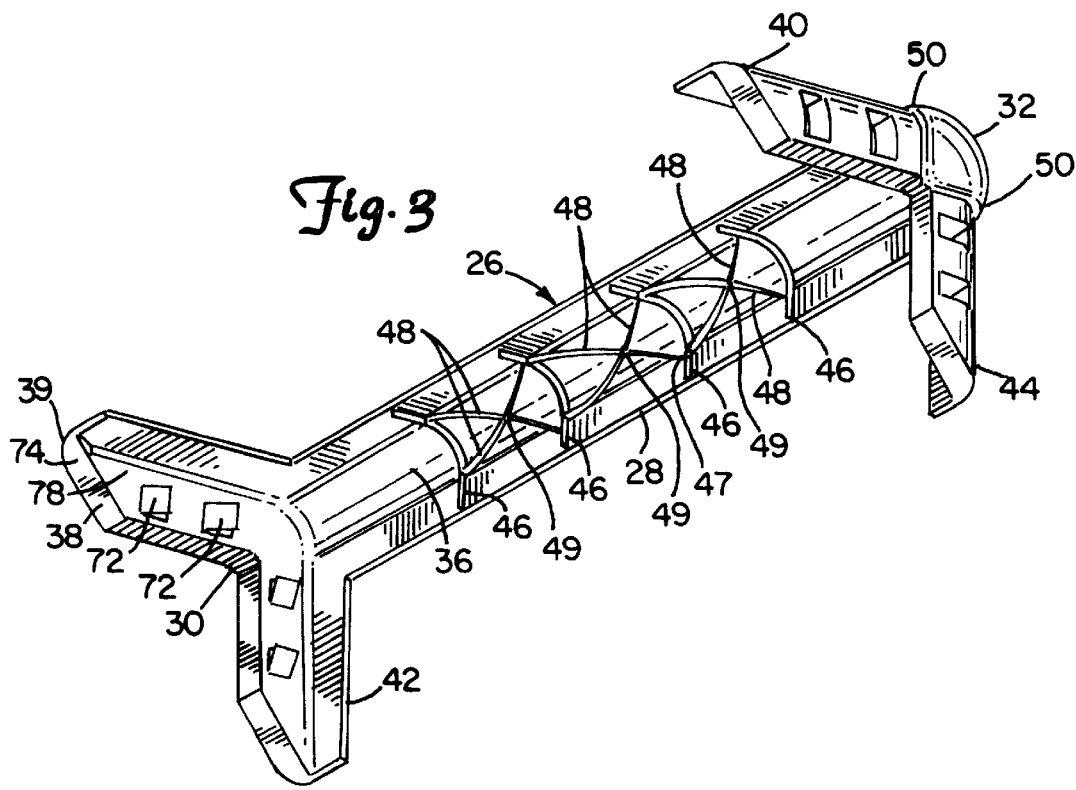

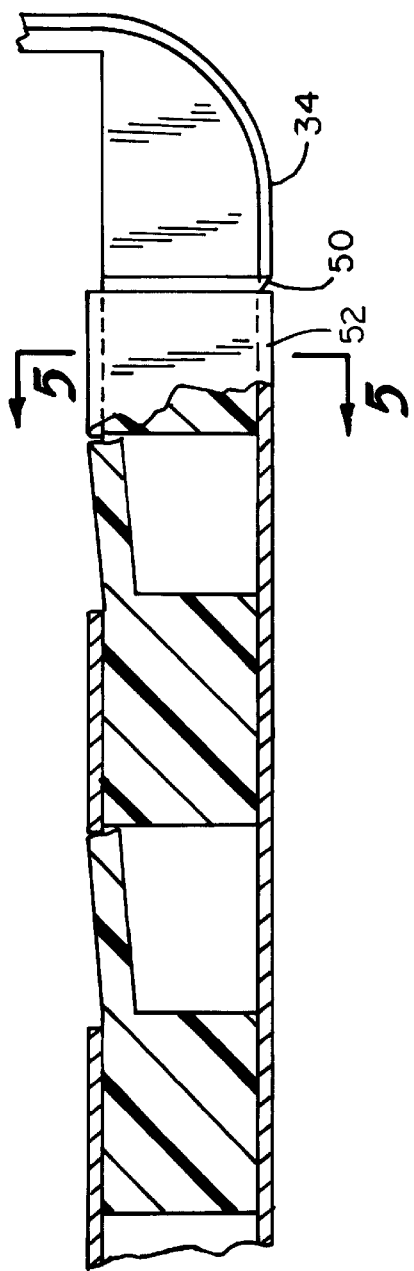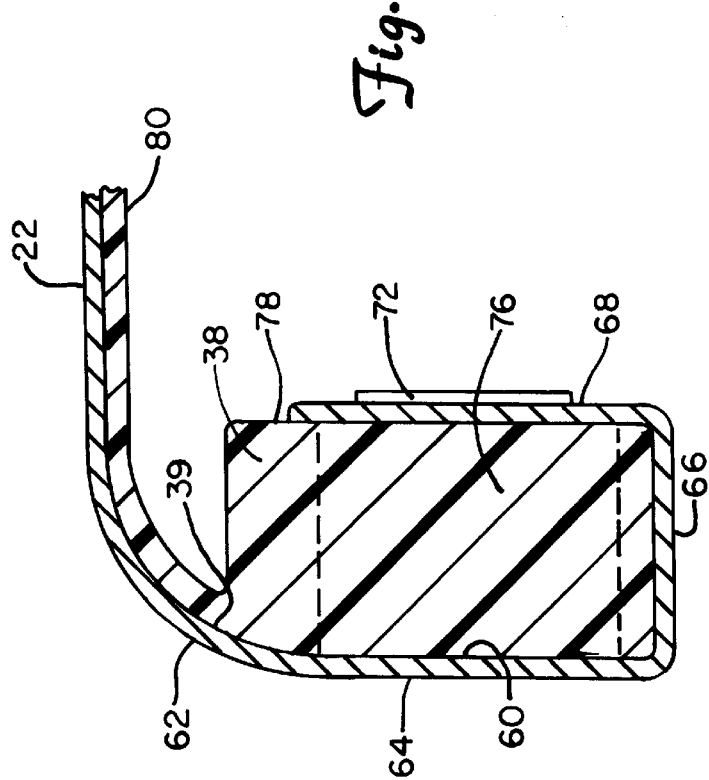

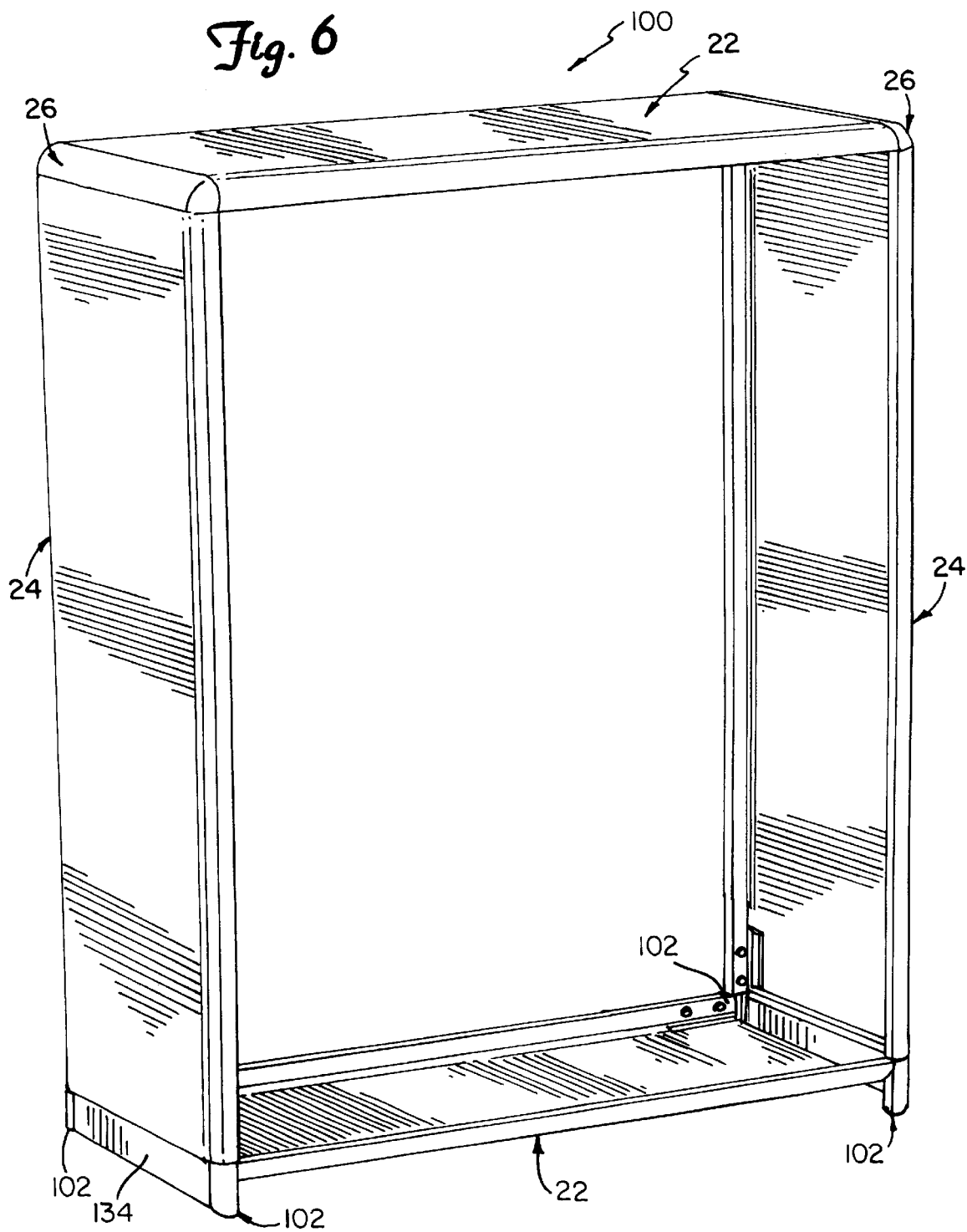

METAL SHELVING CONNECTOR AND KIT

TECHNICAL FIELD

The present invention relates to furniture and, in particular, relates to devices for connecting shelving to uprights while providing safe and attractive exterior appearances.

BACKGROUND

Traditional wood shelving, although expensive and difficult to ship because of its weight, may be rendered safe and attractive by providing a radiused corner finish. A radiused corner finish is a safety feature since sharp corners that can cause inadvertent injuries are eliminated.

Economical metal shelving is useful but often unattractive, difficult to assemble, and frequently involves protruding or sharp edges. Protruding or sharp metal edges are a safety concern.

The present invention provides metal shelving and a plastic connector for the shelving. In combination, the metal shelving and plastic connectors of the present invention provide the look and desirable safety features of more traditional radiused edged wood shelving yet are economical, durable and lightweight.

SUMMARY OF THE INVENTION

The present invention, in a first embodiment, is a shelving kit which can provide economical metal shelving emulating the look and safety features of radiused edged wood shelving. In another embodiment of the present invention, the components of such a kit are assembled to form shelving. An appreciation of the ease of assembly of the kit is perhaps more quickly comprehended after review of yet another embodiment of the present invention, specifically, a connector.

In a preferred embodiment of the present invention, a connector device for attachment of a shelf to an upright includes three elements, a connector body, shelf arms and upright arms. The connector body has an outwardly directed first side, an inwardly directed second side, a first end, and a second end. The shelf arms include at least first and second shelf arms. The first shelf arm extends from adjacent the first end of the connector body and the second shelf arm extends from adjacent the second end of the connector body. The first and second shelf arms are oriented such that they are generally parallel to each other and perpendicular to the connector body. The upright arms include at least first and second upright arms. The first upright arm extends from adjacent the first end of the connector body and the second upright arm extends from adjacent the second end of the connector body. The first and second upright arms are also oriented generally parallel to each other, but are perpendicular to the connector body and to the first and second shelf arms. Preferably, the connector is envisioned to be employed with a shelf and an upright, each of which have parallel receivers for the arms of the connector. Preferably, the connector further includes means, on the arms, for engaging these parallel receivers. Preferably, the connector further includes means for locking the arms within receivers, when the arms are appropriately inserted and engaged in the receivers. More preferably, the arms also include means for facilitating insertion alignment of the arms with the receiver pockets. In a most preferred embodiment, the connector device is formed from molded plastic. ABS plastic is a suitable and preferred plastic from which to prepare the connector. The connector may be prepared by common molding processes, such as injection molding.

One of the advantageous features of such a preferred molded ABS connector is the ability to have the outwardly directed surface of the connector body be molded in a radiused style. A radiused styled connector has a utilitarian aspect in that it reduces sharp edges available for inadvertent injury and thus is a significant safety feature. Such safety and attractiveness is believed previously to be commercially available only in traditional wood shelving. The radiused outside of the connector may be defined as about a quarter of a cylindrical surface arranged about an axis running parallel to and optionally slightly offset from the connector body. As a result of the injection molding process, the inwardly directed side of the connector has a surface generally concentric to the radiused styled surface of the outwardly directed side. Most preferably, the thickness of the molded connector in the radiused portion of the body (i.e., between the outward directed surface side and the inward directed surface side) may be reduced by providing molded ribs protruding from the inward directed surface. The ribs provide stiffness to the connector when it is in use. The ribs, in a most preferred embodiment, are either radially directed in planes perpendicular to the radius defined axis, or helically directed about the axis, or a combination of both. A pitch of about 2:1 in the helical ribs should be used. A 2:1 pitch may also be thought of as about 26.5 degrees to the axis. Most preferably, both right and left helically oriented ribs are provided, in combination with the perpendicular ribs. The combination of reinforcement ribs described herein are believed to be a particularly effective arrangement for stiff reinforcement and reduction of plastic molding material in the connector. An alternative preferred embodiment uses a combination of three types of ribs: radially inward directed ribs, perpendicular to the axis, and ribs in planes at about 26.5 degrees and at about 63.5 degrees to the axis, respectively.

The connector also may include a recessed shelf support surface extending from the connector body parallel to the first and second shelf arms. The recessed shelf support surface preferably terminates at a beveled transition connected to the outwardly directed side of the support body. This area, above the shelf and up to the recess associated with the recessed shelf, accommodates metal shelf material and prevents the metal edge from being a source of cuts. Most preferably, the inward side of the recessed shelf support surface is also reinforced by extensions of the ribs which are perpendicular to the axis.

The connector may be symmetrical about a plane defined by the connector body and bisecting the planes defined by the first and second shelf arms and the first and second upright arms. This symmetry provides the advantage of allowing interchangeability during the assembly process.

As mentioned earlier, a kit for preparing shelving may also be provided according to the present invention. The kit of the present invention includes: a shelf, having a pair of parallel arm receivers; an upright, having a pair of parallel arm receivers; and a connector or plurality of connectors according to the above description. The shelf and upright may be identical in cross section, if a generally square shelving structure is to be formed, and may be fully identical and interchangeable. Preferably, both the shelf and upright have a cross-section which provides receivers for the arms. These may be formed from a bend in a longitudinal edge of a sheet of relatively thin steel sheet material. Preferably, the sheet steel is about 14–26 gauge in thickness.

The bends forming the pockets along the longitudinal edges also stiffen the shelf or upright, enabling the use of thinner and less expensive steel sheeting. A tab or plurality of tabs on the arms may be present to provide a locking mechanism that resiliently engages notches or cut-outs within the receivers to prevent inadvertent disassembly.

The invention also includes a method of assembly for a shelf on an upright. The inventive method includes the steps of: providing a shelf having arm receiving pockets in the end of the shelf; providing an upright having arm receiving pockets in the end of the upright; providing a connector, according to the invention, having two parallel arm pairs which are adapted to fit the receivers; and inserting the upright arms in the upright and inserting the shelf arms in the shelf. If the locking mechanism is present, the assembly is substantially irreversible once the tabs of the arms click into the apertures of the receivers.

BRIEF DESCRIPTION OF THE FIGURES

FIG. 1 is a perspective view of a shelving assembly assembled from a kit of the present invention;

FIG. 2 is a fragmentary, exploded, perspective view of a connector device for the shelving assembly depicted in FIG. 1, the connector being positioned for insertion into a shelf end, depicting the outwardly directed side of the connector body in the preferred radiused style;

FIG. 3 is a perspective view of the connector device of FIG. 1, depicting the inwardly directed side of the connector body in the preferred reinforced radiused style;

FIG. 4 is a fragmentary, longitudinal sectional view depicting a connector arm within a receiver;

FIG. 5 is a sectional view taken along the line 5—5 of FIG. 4;

FIG. 6 is a perspective view of a shelving assembly assembled from an alternative kit of the present invention that includes footed connectors;

DETAILED DESCRIPTION

Figure 7:
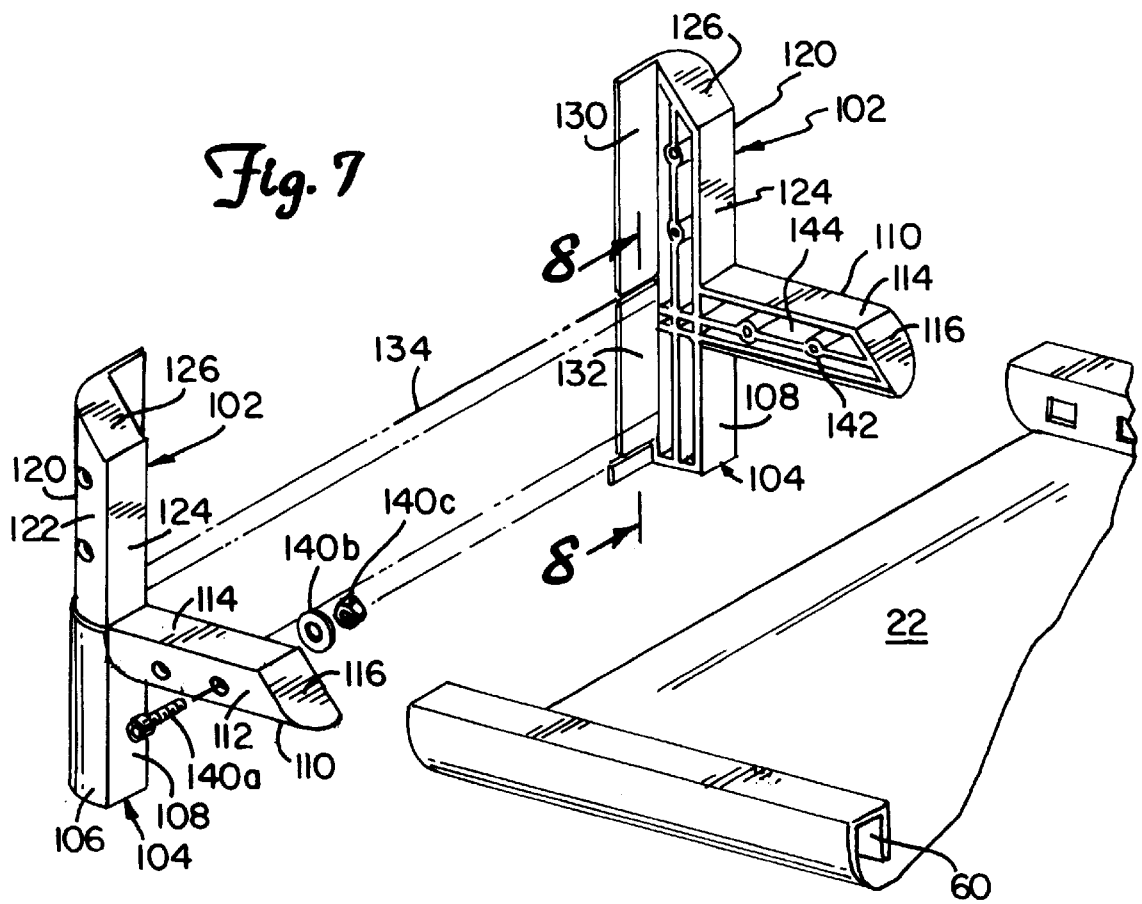
FIG. 7 is a fragmentary, exploded, perspective view depicting a pair of footed connectors positioned for insertion into a lower shelf.

A shelving assembly assembled from the kit of the present invention is shown in FIG. 1, generally at 20. The assembly 20 includes shelves 22, uprights 24, and connectors 26.

As depicted in FIGS. 2 and 3, each connector 26 has a connector body 28 and, a first end 30 and a second end 32 defining a length therebetween. The connector body further defines a width transverse to its length. The body 28 has an outwardly directed side 34, as depicted in FIG. 2, and an inwardly directed side 36, as depicted in FIG. 3. Each connector 26 also includes a first shelf arm 38, extending from the body 28 and adjacent the first end 30, and a second shelf arm 40 extending from the body 28 and adjacent the second end 32. The first shelf arm 38 and the second shelf arm 40 are oriented in a parallel relationship with each other. As depicted in e.g. FIG. 3, connector body 28 is of substantially constant thickness, the thickness being substantially less than the width of connector body 28.

The connector 26 also has a first upright arm 42 extending from the first end 30 and a second upright arm 44 extending from the second end 32. The first and second upright arms 42 and 44 are oriented in a parallel relationship with each other, and perpendicular to the body 28 and the first and second shelf arms 38 and 40.

The inwardly directed side of the body 28 has reinforcement ribs, specifically, radial ribs 46 and helical ribs 48. These ribs 46 and 48 reinforce and stiffen the body 28 to reduce twisting, and reduce the thickness and thereby the quantity of plastic needed to manufacture a sturdy connector 26. Note that the helical ribs 48 preferably include both right and left helically oriented ribs. Preferably, the helical ribs 48 connect on each end to adjacent radial ribs 46, at terminal connections 47, and, moreover, connect to an opposite handed helical rib at mid connections 49. The connections 47 and 49 further reduce twisting and stiffen the body 28.

Preferably, the helical ribs 48 present a pitch of about 2:1 relative to the axis. A most preferred set of ribs 46 and 48 are about 0.045 inches thick, and are about 0.25 inches deep (i.e., measured radially inward from the inwardly directed side 36). Ribs 46 and 45 of such dimensions are appropriate and preferred to stiffen and prevent twist in a connector body 28 having a thickness of about 0.080 inches.

The outwardly directed side 34 of the body 28 presents a radiused surface that is continuous from first end 30 to second end 32. By "radiused" is meant herein that the surface is gently rounded, in a form such as a quarter longitudinal section of a cylinder defining an axis situated offset from and parallel to the body 28. A suitable radius from such an axis can be from about 0.625 inches to about 0.875 inches, such as about 0.781 inches. A similar dimension is used to round the ends 30 and 32 in a spherical manner which might be described as an eighth of a sphere, with a centerpoint on the above described axis. The radiused style surface provides safety as well as aesthetic appearance to the shelving assembly 20.

The radiused surface on the outwardly directed side 34 terminates on each side at a beveled edge 50, leading, in turn, to a support shelf 52. The support shelf 52 and associated beveled edge 50 slightly more than accommodate the thickness of the metal steel sheet of the shelves or uprights. The beveled edge 50 is arranged such that one sliding one's hand from the shelf onto the radiused outward directed surface 34 would barely detect a slight, non-sharp edge. Similarly, one sliding a hand from the radiused outwardly directed surface 34 would barely detect a slight drop to the metal surface of the shelf.

The arms 38, 40, 42, and 44 may be understood by reference to a description of a single representative arm, the first shelf arm 38. Shelf arm 38 has a radiused surface 39 with a radius of 0.750 inches, which is just slightly smaller than the radius of the outwardly directed surface 34. This radiused surface 39 enables the arm 38 to be snugly inserted into a receiver 60 formed in the longitudinal edge of shelf 22. The receiver 60, as shown in cross section in FIG. 5, with arm 38 inserted and locked in place, has a radiused bend 62, a downward extension 64, a bottom 66, which bottom 66 returns toward the shelf 22, and an upturned guide 68. Within the guide 68 of the receiver 60 are apertures 70, which accept resilient tabs 72 on the arm 38.

One of ordinary skill in this art will of course recognize that the dimensions stated herein are those of the preferred embodiment and that those dimensions could be modified and yet still embody the spirit of the present invention.

In addition to the radiused surface 39, arm 38 also includes a taper 74, and a flange 76. On the inside surface 78 of flange 76 is positioned the earlier mentioned resilient tabs 72, for engaging apertures 70 of receiver 60.

Note that receiver 60 of shelf 22 includes an opening to allow insertion passage of an upper flange 80 of arm 38. This upper flange 80 helps support the shelf 22 and stiffen the assembly 20. Arm 44 is preferably identical to arm 38, and arms 40 and 42 are preferably mirror images of arm 38.

A feature of the present invention is that a generally square shelf unit may be formed with four identical shelves/uprights 22/24 and four identical connectors 26. The connectors 26 are symmetrical, thereby reducing expense and simplifying assembly. A kit containing four shelves/uprights 22/24 and four connectors 26 can be shipped in "knockdown" compacted form. A consumer can easily assemble the kit by inserting either pair of arms in the end of a shelf/upright. Errors in assembly are minimized, if not eliminated because of the symmetry of connectors 26 and the interchangeability of the shelf/uprights 22/24. The distinct shape of the arms and the receivers prohibit facing the connector 26 backwards on a shelf/upright 22/24. The assembly method continues by inserting the remaining free pair of arms of the connector 26 into a second shelf/upright 22/24. When eight arm pairs of four connectors 26 are inserted into eight ends of four shelf/uprights, the assembly of the kit is completed.

Referring to in FIG. 6, another embodiment of the present invention 100 includes an alternative footed connectors 102 substituted at the lower shelf for connectors 26. The footed connectors 102 are employed in right handed and left handed pairs as a substitute for a single connector 26.

Figure 8:
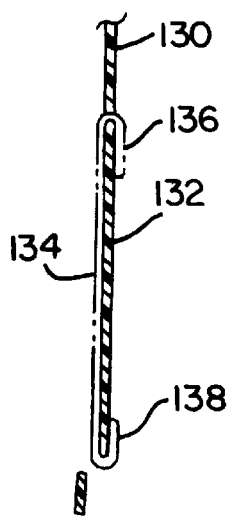
FIG. 8 is a fragmentary, sectional view taken along the line at 8—8 of FIG. 7.

Footed connectors 102 each include a foot 104. The foot 104 has a radiused outward directed surface 106 and an adjoining flat face 108. The footed connector 102 also has a single shelf arm 110, with a radiused surface 112, a flat surface 114, and a taper 116. When the foot 104 is directed downwardly, the shelf arm 110 extends horizontally and is insertable in a receiver 60 of shelf 22. The footed connector 102 also has an upright arm 120. The upright arm 120 has a radiused surface 122, a flat surface 124 and a tapered surface 126. The upright arm 120 also has an upright support 130 and the foot 104 has a kickplate support 132 to support a kickplate 134. As depicted in FIG. 8, the kickplate 134 has an overtab 136 and an undertab 138 formed by bending metal sheet to form a narrow receiver pocket extending along the backside of the kickplate 134. The kickplate 134 extends between a mirror image pair of footed connectors 102.

In another embodiment, the lower shelf 22 can be altered to place the flat surface above the receivers rather than below the receivers.

FIG. 7 also depicts threaded connectors 140 a, b, and c, which may be used as an alternative to resilient tabs 72 disclosed earlier. In association with threaded connectors 140, the arms 110 and 120 have apertures 142, positioned to accept the threaded connectors 140. Alternatively, tapered, threaded screws (not shown) could be inserted into the apertures 142 from the inward side of the arms 110. Preferably, the apertures 142 are molded into longitudinal reenforcement ribs 144.

Because numerous modifications may be made of this invention without departing from the spirit thereof, the scope of the invention is not to be limited to the single embodiment illustrated and described. Rather, the scope of the invention is to be determined by the appended claims and their equivalents.

What is claimed is:

1. A connector device for coupling a shelf to an upright, the shelf and the upright being disposed in a generally transverse relationship and having substantially equal width dimensions, the connector device comprising:

a connector body having opposed first and second ends defining a length therebetween, the connector body further defining a width transverse to the length, the connector body presenting a connecting outer surface, the outer surface being constructed for extending between the shelf and the upright first and second shelf arms, the first shelf arm extending from the first end of the connector body and the second shelf arm extending from the second end of the connector body, the first and second shelf arms each terminating at a distal end, the distal end having a tapered surface;

first and second upright arms, the first upright arm extending from the first end of the connector body and the second upright arm extending from the second end of the connector body, the first and second upright arms each terminating at a distal end, the distal end having a tapered surface;

wherein the connecting outer surface of the connector body is continuous from the first end to the second end, further wherein the connector body is of substantially constant thickness, the thickness of the connector body being substantially less than the width of the connector body.

2. The device of claim 1 wherein the connector body outer surface has a first edge for disposition in a substantially flush relationship with a shelf edge and the connector body outer surface has a second edge for disposition in a substantially flush relationship with an upright edge, the connector body outer surface presenting a radiused transition surface extending between the transversely disposed shelf and upright.

3. The device of claim 2, further including means for locking each of the first and second shelf arms and each of the first and second upright arms within corresponding receivers defined in the shelf and upright respectively.

4. The device of claim 3, further including means for facilitating insertion alignment within the receivers, said means being defined on the distal ends of each of the arms.

5. A furniture kit, comprising:

at least one shelf having a shelf outwardly presented surface;

at least one upright having an upright outwardly presented surface, the shelf and the upright adapted for being disposed in a generally transverse relationship and having substantially equal width dimensions; and a connector, the connector including:

a connector body having opposed first and second ends and defining a length therebetween, the connector body further defining a width transverse to the length, the connector body presenting a connecting outer surface adapted for extending between the shelf outwardly presented surface and the upright outwardly presented surface to define a corner at a juncture of the shelf and the upright a pair of substantially parallel shelf arms extending from the first end of the connector body, each shelf arm terminating at a distal end, the distal end having a tapered surface and being adapted for locking insertion into a respective parallel arm receiver defined in the shelf, and a pair of substantially parallel upright arms extending from the second end of the connector body, each upright arm terminating at a distal end, the distal end having a tapered surface and being adapted for locking insertion into a respective parallel arm receiver defined in the upright;

wherein the connecting outer surface of the connector body is continuous from the first end to the second end, further wherein the connector body is of substantially constant thickness, the thickness of the connector body being substantially less than the width of the connector body.

6. The kit of claim 5, wherein the connector body outer surface has a first edge adapted for disposition in a substantially flush relationship with a shelf edge and the connector body outer surface has a second edge adapted for disposition in a substantially flush relationship with an upright edge, the connector body outer surface presenting a radiused transition surface adapted for extending between the transversely disposed shelf and upright.

7. The kit of claim 6, wherein the upright and the shelf are interchangeable and the connector is symmetrical about a plane bisecting the planes defined by the parallel shelf arms and the parallel upright arms.

* * * * *